(12) United States Patent
Sardesai et al.

(10) Patent No.: US 11,647,078 B2
(45) Date of Patent: May 9, 2023

(54) CONTENT CONSUMPTION MEASUREMENT FOR DIGITAL MEDIA USING A BLOCKCHAIN

(71) Applicant: Verizon Patent and Licensing Inc., Basking Ridge, NJ (US)

(72) Inventors: Ashish Sardesai, Ashburn, VA (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/850,287

(22) Filed: Apr. 16, 2020

(65) Prior Publication Data

US 2021/0329075 A1 Oct. 21, 2021

(51) Int. Cl.
*H04N 7/16* (2011.01)
*H04L 67/125* (2022.01)
*H04N 21/24* (2011.01)
*H04L 9/06* (2006.01)
*H04L 67/50* (2022.01)

(52) U.S. Cl.
CPC .......... *H04L 67/125* (2013.01); *H04L 9/0637* (2013.01); *H04L 67/535* (2022.05); *H04N 21/2407* (2013.01)

(58) Field of Classification Search
CPC ..... H04L 67/125; H04L 67/22; H04L 9/0637; H04N 21/2407
See application file for complete search history.

(56) References Cited

U.S. PATENT DOCUMENTS

| | | | |
|---|---|---|---|
| 10,320,843 B1* | 6/2019 | Dobrek | H04L 9/0822 |
| 10,419,209 B1* | 9/2019 | Griffin | H04L 9/3263 |
| 10,476,847 B1* | 11/2019 | Smith | H04L 63/102 |
| 2019/0026212 A1* | 1/2019 | Verkasalo | H04L 67/306 |
| 2019/0213304 A1* | 7/2019 | Webb | H04L 69/24 |
| 2019/0304038 A1* | 10/2019 | Purushothaman | G06Q 50/163 |
| 2019/0306230 A1* | 10/2019 | Purushothaman | H04L 67/125 |
| 2019/0386818 A1* | 12/2019 | Cran | H04L 9/3239 |
| 2020/0134595 A1* | 4/2020 | Musiala, Jr. | G06Q 20/36 |
| 2020/0272619 A1* | 8/2020 | Alferov | G06Q 50/265 |
| 2020/0327546 A1* | 10/2020 | Pennington | G06Q 20/223 |
| 2020/0341951 A1* | 10/2020 | Oberhofer | H04L 9/50 |
| 2020/0366950 A1* | 11/2020 | Manganilla | H04N 21/2543 |
| 2020/0372135 A1* | 11/2020 | Li | H04L 9/3242 |
| 2021/0051013 A1* | 2/2021 | Li | H04L 9/321 |

* cited by examiner

*Primary Examiner* — Annan Q Shang

(57) ABSTRACT

A device may include a memory storing instructions and processor configured to execute the instructions to receive, by a blockchain node, a content consumption report from a user device relating to a digital content item provided by a content provider device to the user device and add content consumption data from the content consumption report to a blockchain associated with the blockchain node. The processor may be further configured to receive, by the blockchain node, a request for consumption information relating to the digital content item stored in the blockchain from a rights-holder associated with the digital content item; verify, by the blockchain node, that the rights-holder is authorized to access the requested consumption information; and provide, by the blockchain node, the requested consumption information from the blockchain to the rights-holder.

20 Claims, 7 Drawing Sheets

CONTENT CONSUMPTION MEASUREMENT FOR DIGITAL MEDIA USING A BLOCKCHAIN

BACKGROUND INFORMATION

Content providers may stream digital content to user devices and consumers of the digital content may use the user devices to view the digital content. An important aspect of generation, distribution, and consumption of digital content is the determination of viewership data. For example, a digital media distributor may purchase streaming rights for a live event that includes multiple performers. The performers may be compensated based on the viewership data, associated with the video stream, provided by the digital media distributor to users. However, the performers may not trust the viewership data reported by the digital media distributor. Therefore, providing trustworthy viewership data may present various challenges.

DETAILED DESCRIPTION OF PREFERRED EMBODIMENTS

Figure 1:
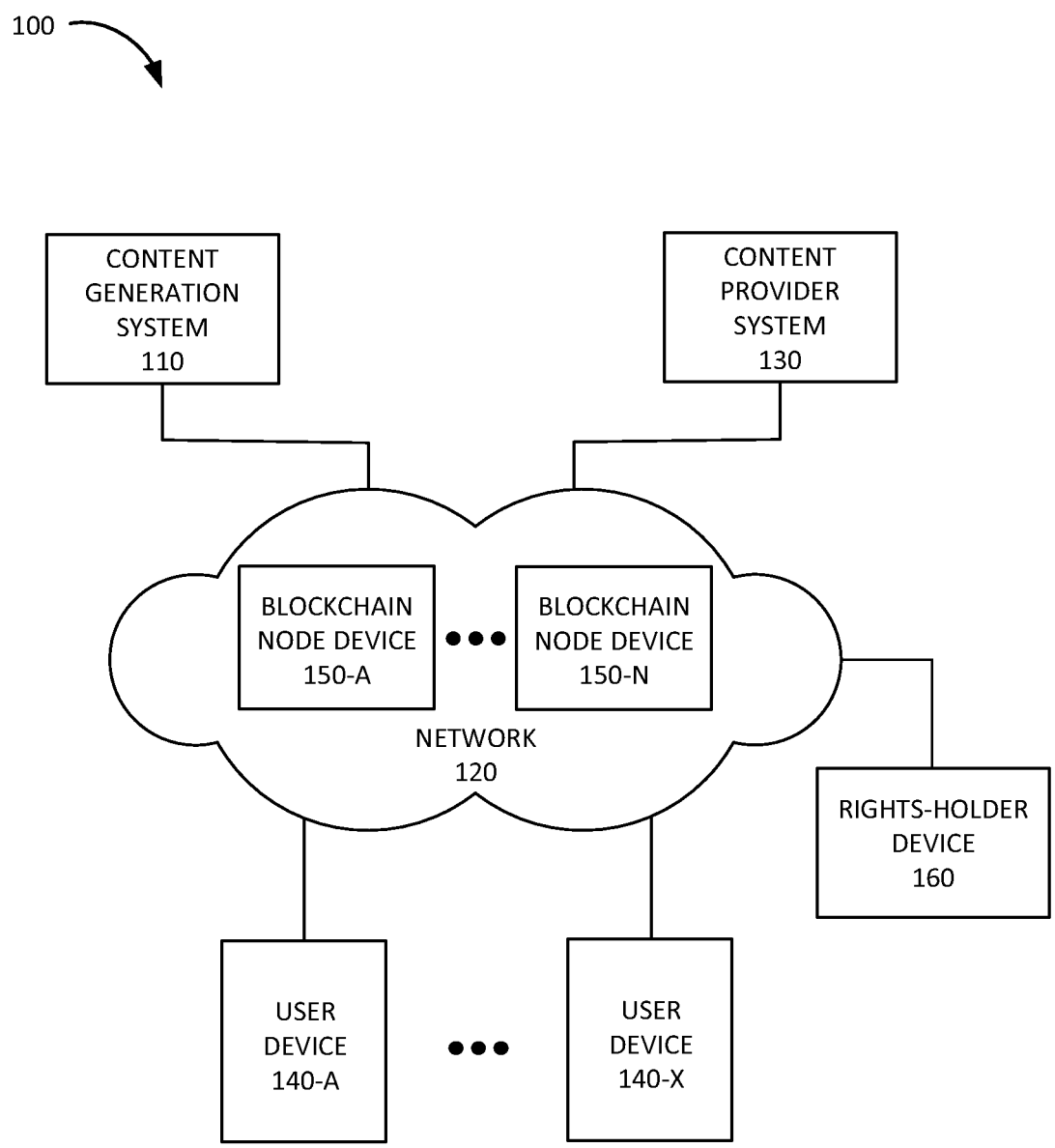
FIG. 1 illustrates an environment according to an implementation described herein.

The following detailed description refers to the accompanying drawings. The same reference numbers in different drawings identify the same or similar elements.

Methods used by auditors, agents, and/or representatives for reconciling viewership data may be labor-intensive, time consuming, and complex due to varying data formats across different organizations or content providers and due to the multiple systems and parties that maybe involved in delivering content to consumers of the content. Furthermore, compensation models for digital media companies requires trust from content generators, such as performance artists and their representatives, such as agents, recording labels, and/or managers, since audience viewership counts recorded for a particular digital distribution platform may be a major contributing factor for calculating and paying out compensation to the performance artists and their representatives. However, the performance artists, or their associated representatives, may perceive the reporting of the viewership data by the content distributor as an economic conflict of interest, since viewership counts may be potentially misrepresented to favor the content distributor, because the content consumption measurement and reporting method may not provide multi-party transparency, auditing, and/or data integrity assurances.

One technology that exhibits desirable properties for addressing these issues is the use of a blockchain network. Blockchain technology enables more efficient collection and reporting of content consumption data by maintaining an automated audit transaction trail, thus reducing the need for manual processing for data validation and reconciliation. Furthermore, a blockchain may alleviate economic conflict of interest issues by providing data transparency and data integrity assurances to all parties involved within a digital media ecosystem.

The "blockchain," as the term is used herein, is a distributed ledger of linked data blocks in which the blocks are linked using cryptographic hashes. Thus, each data block may be linked to the previous data block using a hash of the content of the previous block. Since changing the data in the previous data block would change the hash, the data stored in the blockchain cannot be changed without having to change the hashes of all subsequent data blocks, rendering the blockchain resistant to data changes. Furthermore, the blockchain may be distributed across a set of multiple nodes, with each node including a copy of the blockchain. An addition to the blockchain may be proposed by a node and approved if a quorum of nodes in the set of nodes reaches a consensus. Various consensus mechanisms may be used by a blockchain, depending on the application. The immutability and distributed nature of the data stored in the blockchain, as well as requirement to reach consensus to add data to the blockchain, make blockchain a desirable technology for recording and reporting content consumption information for various forms of digital content.

Implementations described herein relate to content consumption measurements for digital media using a blockchain. User devices that include an application for consuming digital content, such as a browser application, a video stream player, a game, and/or another type of application, may be provided with an Application Programming Interface (API) and configured to use the API to report consumption information to a computer device that includes a node of a blockchain that stores consumption information for digital content items. Thus, the consumption information is reported to the blockchain from the user devices, rather than provided by a content provider platform, such as a video streaming service. The digital content items may include a video stream of a live event, such as, for example, a music performance or a sporting event; a video stream of a stored digital media item, such as, for example, a television program or a movie; an advertisement; a game; and/or another type of digital content. In some implementations, the blockchain may store different content consumption data for different types of digital content items.

"Content consumption," as the term is used herein, refers to a user using or accessing a digital content item, such as viewing a streaming video or listening to streaming audio, viewing an advertisement, clicking on an advertisement, playing a game, typing in information or filling out a survey, and/or otherwise viewing or actively interacting with interactive digital content.

The user device application may, using the API, invoke a smart contract function on the blockchain platform at particular intervals (e.g., once per second, etc.) to send a content consumption report for one or more digital items being consumed on the user device. The smart contract function on the blockchain platform may record content consumption data from the content consumption report in the blockchain and may attribute the consumption information to the appropriate content generation entity (e.g., a performance artist or group, etc.).

A blockchain node, implemented on a computer device, may be configured to provide an API to user devices. The API may enable user devices to send, to the blockchain node, content consumption reports relating to consumption of digital content items provided to the user devices by content providers. The blockchain may be configured to receive, from a user device and via the provided API, a content consumption report relating to a digital content item provided by a content provider device to the user device and add content consumption data from the content consumption report to a blockchain.

The content consumption report received from the user device may include, for example, a content identifier identifying the digital content item, a pseudonymous user identifier associated with a user of the user device, and one or more timestamps (e.g., indicating a start time and an end time of consumption) for the digital content item. If the digital content item corresponds to streaming video, the content consumption report may further include information identifying a stream type associated with the consumption of the digital content item, an indication whether the digital content item was started automatically, information indicating how many times the digital content item was paused, and/or other types of information that may be associated with measuring consumption of streaming video.

The blockchain node may be further configured to provide another API to rights-holders that enables rights-holders to access consumption information stored in the blockchain for which the rights-holders have access rights. The blockchain may be configure to receive, via the provided API, a request for consumption information (which relates to the digital content item) that is stored in the blockchain from a rights-holder associated with the digital content item and verify whether the rights-holder is authorized to access the requested consumption information. If the rights-holder is verified, the blockchain node may provide the requested consumption information to the rights-holder based on the content consumption data added to the blockchain.

In some implementations, access rights associated with rights-holder may be stored in a separate access rights blockchain and the blockchain node may determine whether the rights-holder is registered in an access rights blockchain as having access rights for information relating to the digital content item. Verifying access rights for a user attempting to obtain consumption information for a digital content item may ensure that only authorized users (e.g., owners, content generators, authorized agents or representatives, etc.) may retrieve consumption information for the digital content item.

The blockchain node may distribute the content consumption data to the other blockchain nodes associated with the blockchain, determine that consensus has been reached by the blockchain to add the content consumption data to the blockchain, and add the content consumption data to the blockchain, in response to determining that consensus has been reached.

The consensus mechanism used by the blockchain to reach consensus may include one or more of a Proof-of-Authority consensus process, a Proof-of-Stake consensus process, a Proof-of-Elapsed-Time consensus process, a Paxos consensus process, a Phase King consensus process, a Practical Byzantine Fault Tolerance consensus process, a Federated Byzantine Agreement consensus process, and/or another type of consensus mechanism.

The blockchain node may be further configured to receive a request for aggregate content associated with the digital content item, aggregate content consumption data items for the digital content item from the blockchain to determine a total number of users that consumed the digital content item or a total consumption time for the digital content item, and provide information identifying the determined total number of users or the total consumption time to the rights-holder in response to the received request.

The blockchain node may be further configured to receive a content streaming report relating to the digital content item from a content provider device and to add content streaming data from the content streaming report to the blockchain. The blockchain node may further determine a performance metric value for the digital content item based on the content streaming data and the content consumption data and add the performance metric value for the digital content item to the blockchain.

FIG. 1 is a diagram of an exemplary environment 100 in which the systems and/or methods, described herein, may be implemented. As shown in FIG. 1, environment 100 may include a content generation system 110, a network 120, a content provider system 130, UE devices 140-A to 140-X (referred to herein individually as "UE device 140" and collectively as "UE devices 140"), blockchain node devices 150-A to 150-N (referred to herein individually as "blockchain node device 150" and collectively as "blockchain node devices 150"), and a rights-holder device 160.

Content generation system 110 may include one or more computer devices configured to generate digital content. As an example, content generation system 110 may include one or more computer devices coupled to cameras and microphones configured to capture a live event, such as a musical performance event and/or another type of performance art, a sporting event, and/or another type of live event. As another example, content generation system 110 may include one or more computer devices that produce video content to be stored for later viewing, generate advertisements, host an online game, generate a survey, and/or generate another type of digital content. The digital content generated by content generation system 110 may be provided to content provider system 130 for streaming or another type of distribution to user devices 140 via network 120.

Network 120 may enable content generation system 110, content provider system 130, user devices 140, blockchain node devices 150, and/or rights-holder device 160 to communicate with each other. For example, network 120 may enable the establishment of an Internet Protocol (IP) connection between any of generation system 110, content provider system 130, user devices 140, blockchain node devices 150, and/or rights-holder device 160. Network 120 may include a local area network (LAN), a wide area network (WAN), a metropolitan area network (MAN), an optical network, a cable television network, a satellite network, an ad hoc network, a telephone network (e.g., the Public Switched Telephone Network (PSTN) or a cellular network), an intranet, and/or a combination thereof.

Furthermore, network 120 may include a Radio Access Network (RAN) and a core network associated with the RAN. The RAN may enable user devices 140 to connect to network 120 via wireless signals for mobile telephone service, Short Message Service (SMS) message service, Multimedia Message Service (MMS) message service, Rich Communication Services (RCS) service, Internet access, Multi-Access Edge Computing (MEC) services, cloud computing, and/or other types of data services. RAN 120 may include base stations that each include a radio frequency (RF) transceiver facing a particular direction. The base stations may include a Fourth Generation (4G) base station configured to communicate with user devices 140 as an eNodeB that uses a 4G Long Term Evolution (LTE) air interface, a Fifth Generation (5G) base station configured to communicate with user devices 140 as a gNodeB that uses a 5G New Radio (NR) air interface, and/or another type of base station.

The RAN may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Network 120 may include one or more MEC networks. A MEC network may be in proximity to the one or more base stations from a geographic and network topology perspective. As an example, the MEC network may be located on a same site as one of the one or more base stations. As another example, the MEC network may be geographically closer to the one or more base stations, and reachable via fewer network hops and/or fewer switches, than other base stations. As yet another example, the MEC network may be reached without having to go through a gateway device, such as a 4G Packet Data Network Gateway (PGW) or a 5G User Plane Function (UPF). The MEC network may include one or more MEC devices that include particular hardware capabilities, such as particular Central Processing Units (CPUs), Graphics Processing Units (GPUs), hardware accelerators, and/or other types of hardware capabilities; particular software capabilities, such as a particular operating system, virtual machine, virtual container, application, and/or another type of software capability; and/or other functionality that enables the MEC devices to operate at low latency. In some implementations, one or more blockchain node devices 150 may be implemented on the one or more MEC devices.

The core network associated with the RAN may include a 4G LTE core network (e.g., an evolved packet core (EPC) network), a 5G core network, and/or another type of core network. A 4G network may include devices that implement network functions that include a Mobility Management Entity (MME) that implements control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 150; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to other packet data networks, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device 140; and/or other types of network functions. Furthermore, a 5G core network may implement network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular QoS class, type of service, and/or particular enterprise customer associated with a set of UE devices.

Content provider system 130 may include one or more computer devices configured to stream or otherwise provide the digital content generated by content generation system 150 to user devices 140 For example, content provider system 130 may include a video streaming platform accessible via a browser application, video streaming application, and/or another type of application; a gaming platform; an audio streaming platform; an advertisement delivery platform; and/or another type of platform for distributing digital content.

User device 140 may include any device with communication functionality and a user interface to enable a user to consume digital content received from content provider system 130. For example, user device 140 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless and/or wired communication capabilities and a user interface. UE device 140 may include capabilities for voice communication, mobile broadband services (e.g., video streaming, real-time gaming, premium Internet access etc.), best effort data traffic, and/or other types of applications.

Blockchain node device 150 may include a computer device that implements a blockchain node for a blockchain that records and maintains content consumption information. In some implementations, blockchain node device 150 may be managed by a provider of telecommunication services. As an example, blockchain node device 150 may correspond to a MEC device in a MEC network managed by the provider. As another example, blockchain node device 150 may be implemented in a cloud computing center managed by the provider. In other implementations, blockchain node device 150 may be managed by another entity, such as a rights-holder associated with digital content (e.g., a performance artists agency or recording label, a game development company, an advertising platform, etc.). For example, blockchain node device 150 may be managed by rights-holder device 160. As yet another example, blockchain node device 150 may be hosted by the provider and managed by a rights-holder.

Rights-holder device 160 may include any type of device described above with respect to user device 140. Rights-holder device 160 may be associated with a holder of access rights for information relating to a particular digital content item for which consumption information has been stored in a blockchain associated with blockchain node device 150. For example, the rights-holder may correspond to an owner of a digital content item, a performance artist associated with a performance recording corresponding to a digital content item, a manager of a performance artist, a producer associated with a performance, a game developer, an advertisement agency, and/or another type of rights-holder that has an agreement with content provider system 130 for compensations based on consumption information (e.g., number of views, etc.) for a particular digital content item. Blockchain node device 150 may grant access rights to rights-holder device 160 after rights-holder device 160 registers with the blockchain. In some implementations, the access rights for consumption information stored in the blockchain may be stored in another blockchain managed by blockchain node device 150.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
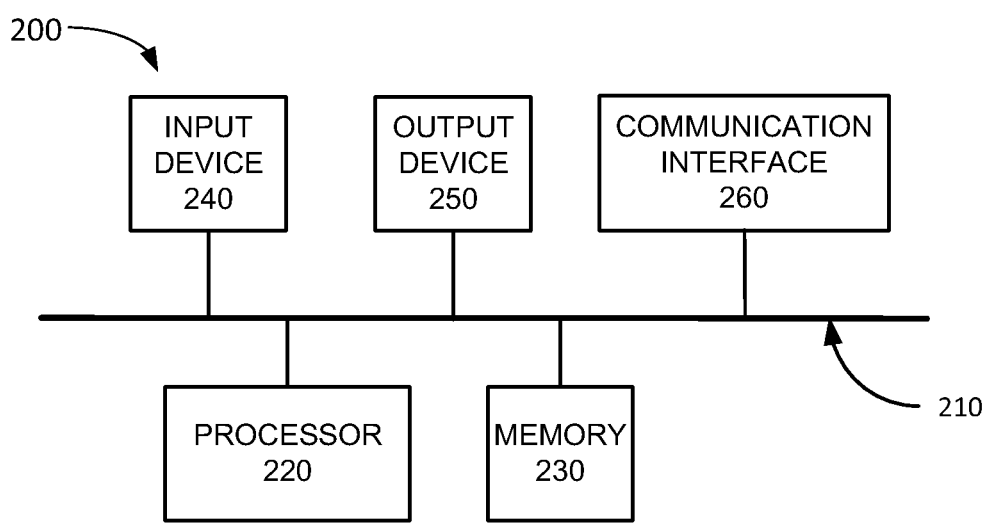
FIG. 2 illustrates exemplary components of a device that may be included in the environment of FIG. 1 according to an implementation described herein.

FIG. 2 is a diagram illustrating example components of a device 200 according to an implementation described herein. Content generation system 110, content provider system 130, user device 140, blockchain node device 150, and/or rights-holder device may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to content consumption measurement using a blockchain. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
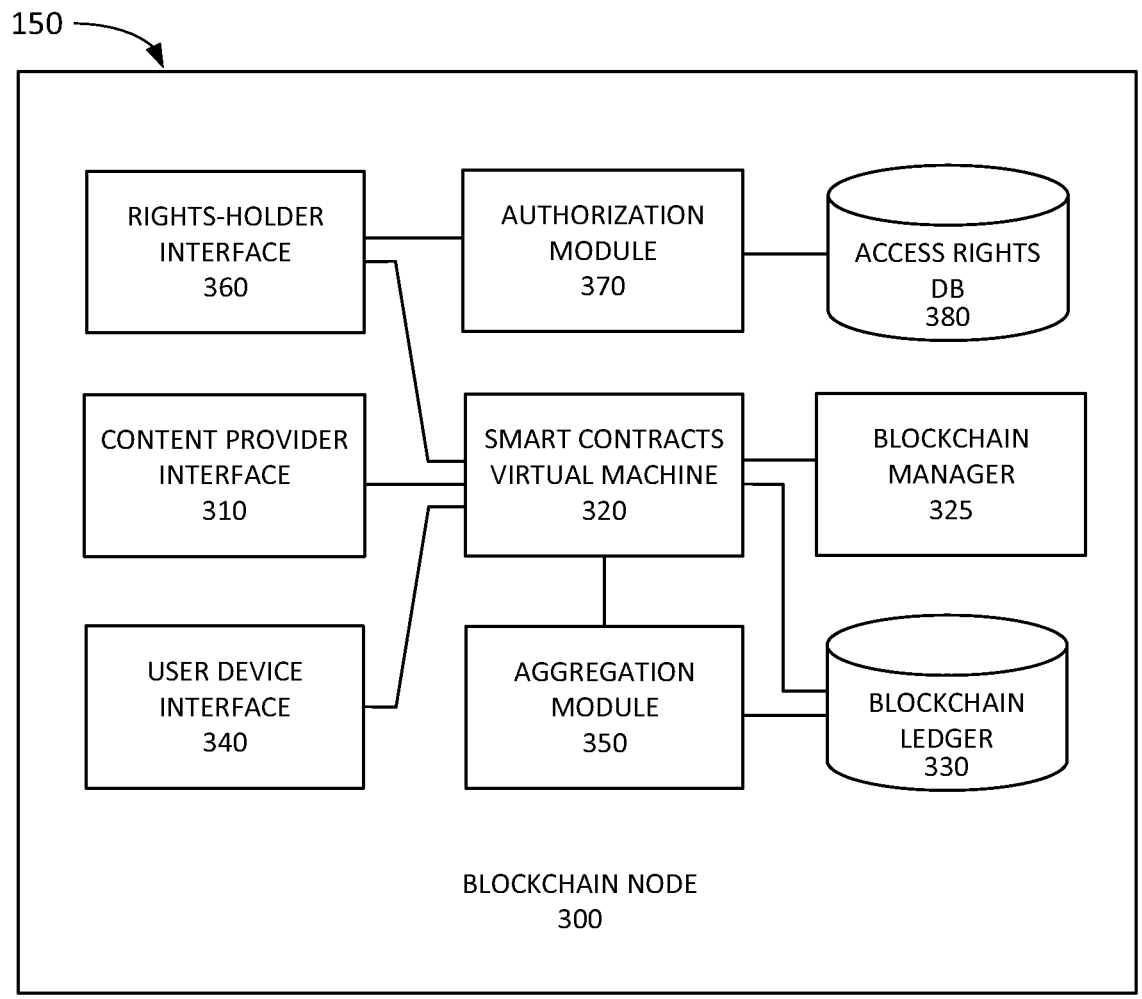
FIG. 3 illustrates exemplary components of the blockchain node device of FIG. 1 according to an implementation described herein.

FIG. 3 is a diagram illustrating exemplary components of blockchain node device 150. The components of blockchain node device 150 may be implemented, for example, via processor 220 executing instructions from memory 230. Alternatively, some or all of the components of blockchain node device 150 may be implemented via hard-wired circuitry. As shown in FIG. 3, blockchain node device 150 may include a blockchain node 300. Blockchain node 300 may be associated with one or more blockchains. Blockchain node 300 may include a content provider interface 310, a smart contracts virtual machine 320, a blockchain manager 325, a blockchain ledger 330, a user device interface 340, an aggregation module 350, a rights-holder interface 360, an authorization module 370, and an access rights database (DB) 380.

Content provider interface 310 may be configured to communicate with content provider system 130. For example, content provider interface 310 may provide an API, such as a Representational State Transfer (REST) API to content provider system 130 that content provider system 130 may use to send a content streaming report that includes information relating to a particular digital content item. The content streaming report may be used to determine one or more performance metrics for the particular digital content item, such as a latency value, a packet delivery rate value, a throughput value, and/or another type of performance metric value.

Smart contracts virtual machine 320 may manage and execute smart contracts associated with a blockchain. For example, smart contracts virtual machine 320 may update the blockchain stored in blockchain ledger 330 based on information received from content provider system 130 and/or based on information received from user device 140, perform aggregation of content consumption information stored in blockchain ledger 330, and respond to requests, from rights-holder-device 160, for information stored in blockchain ledger 330. In addition, smart contract virtual machine 320 may execute other types of smart contracts associated with blockchain ledger 330.

Blockchain manager 325 may manage operations associated with a blockchain, such as managing blockchain node membership. For example, in some implementations, the blockchain may be permissionless and new blockchain nodes 300 (e.g., in the same blockchain node device 150 or in another blockchain node device 150) may automatically join the set of blockchain nodes 300 associated with the blockchain without approval (i.e., without the set of blockchain nodes 300 having to reach consensus to add the new blockchain node 300 to the set). In other implementations, the blockchain may be permissioned and new blockchain nodes 300 may need to be approved by existing blockchain nodes 300 to join the blockchain. For example, the existing blockchain nodes 300 may need to reach consensus, using a particular consensus mechanism and a particular quorum of nodes, to add the new blockchain node 300 to the set of blockchain nodes 300 associated with the blockchain.

Blockchain manager 325 may be configured to communicate with other blockchain nodes 300 associated with the blockchain. For example, blockchain manager 325 may send a proposal to the other blockchain nodes 300 to add a data block to the blockchain, may receive a proposal to add a data block from another blockchain node 300, may respond to a proposal with an accept or reject message in an attempt to generate consensus about whether a proposed data block should be added to the blockchain, and/or may send or receive other types of messages to or from other blockchain nodes 300.

The consensus mechanism used by blockchain manager 325 to reach consensus may include one or more of a Proof-of-Authority consensus process, a Proof-of-Stake consensus process, a Proof-of-Elapsed-Time consensus process, a Paxos consensus process, a Phase King consensus process, a Practical Byzantine Fault Tolerance consensus process, a Federated Byzantine Agreement consensus process, and/or another type of consensus mechanism. Blockchain ledger 330 may store a blockchain ledger associated with blockchain node 300. Exemplary information that may be stored in blockchain ledger 330 is described below with reference to FIG. 4.

User device interface 340 may be configured to communicate with user device 140. For example, user interface 340 may provide an API, such as a REST API, that user device 140 may use to send a content consumption report to blockchain node 300. The content consumption report may include information identifying a digital content item (i.e., a content identifier), a pseudonymous user identifier associated with a user of user device 140, and timestamps indicating a start time and an end time of consumption for the digital content item by the user. If the digital content item corresponds to a streaming video, the content consumption report may further include information identifying a stream type, an indication whether the digital content item was started automatically, information indicating how many times the digital content item was paused, and/or other types of information that may be associated with measuring consumption of streaming video.

Aggregation module 350 may obtain statistics or calculate aggregate content use-parameters/characteristics of the data stored in blockchain ledger 330 (herein referred to as "aggregation data"). For example, aggregation module 350 may determine a total number of users that consumed a particular digital content item and/or a total time spent consuming the particular digital content item; consumption information for a particular user, such as a total time spent consuming for the particular user, types of content consumed by the particular user, times of day or days of week during which the particular user consumed content, etc.; one or more performance metrics for a particular digital content item, such as latency, packet delivery rate, throughput, etc.; and/or other types of data aggregation.

Rights-holder interface 360 may be configured to communicate with rights-holder device 160. For example, rights-holder interface 360 may provide an API, such as a REST API, that rights-holder device 160 may use to register with blockchain node 300 and to request consumption information for content items to which the user of rights-holder device 160 has access rights. Authorization module 370 may authorize rights-holder device 160 based on information stored in access rights DB 380. Access rights DB 380 may store information relating a particular rights-holder to one or more rights-holder devices 160 and one or more digital content items.

In some implementations, access rights DB 380 may store an access-rights blockchain that stores information indicating access rights for rights-holders. For example, rights-holder device 160 may register with blockchain node 300. During the registration, blockchain node 300 may seek a consensus with the other blockchain nodes 300 associated with the access rights blockchain, on whether the user has a right to access a particular digital content item and may store the access rights information in access rights DB 380 if consensus is reached. Rights-holder device 160 may be registered in the access rights blockchain using an identifier such as, for example, an International Mobile Equipment Identity (IMEI), a Mobile Directory Number (MDN), an International Mobile Subscriber Identity (IMSI), a Mobile Station International Subscriber Directory Number (MSISDN), a Globally Unique Temporary Identity (GUTI), a Cell Radio Network Temporary Identity (CRTNI), an IP address, a Media Access Control (MAC) address, and/or another type of identifier associated with rights-holder device 160.

Although FIG. 3 shows exemplary components of blockchain node 300, in other implementations, blockchain node 300 may include fewer components, different components, differently arranged components, or additional components than depicted in FIG. 3. Additionally, or alternatively, one or more components of blockchain node 300 may perform functions described as being performed by one or more other components of blockchain node 300.

Figure 4:
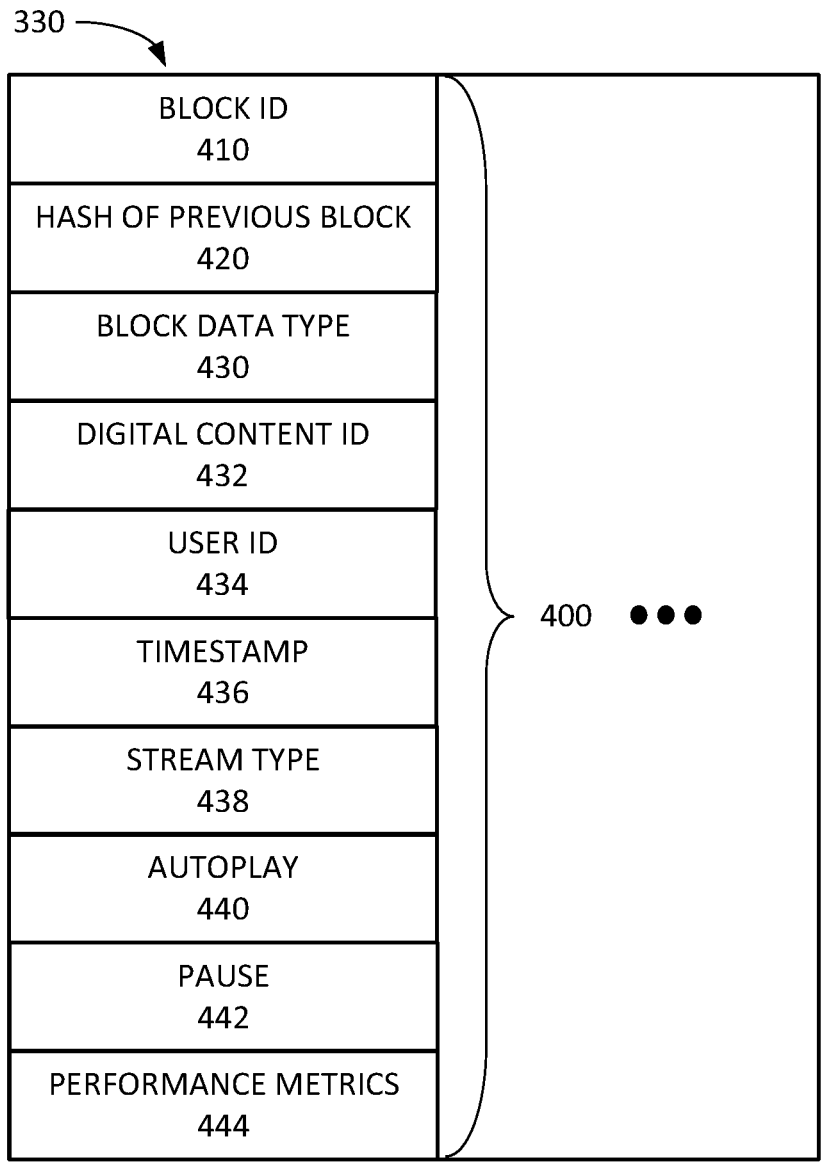
FIG. 4 illustrates exemplary components of the blockchain database of FIG. 3 according to an implementation described herein.

FIG. 4 is a diagram illustrating exemplary information stored in blockchain ledger 330 according to an implementation described herein. As shown in FIG. 4, blockchain ledger 330 may store a blockchain ledger that includes one or more block records 400. Each block record 400 may store information relating to a particular data block of the blockchain ledger associated with blockchain ledger 330. Each block record 400 may include data relating to a content consumption report received from user device 140 and recorded as a transaction for the blockchain ledger. For example, each block record 400 may include a block identifier (ID) field 410, a hash of a previous block field 420, a block data type field 430, a digital content ID field 432, a user ID field 434, a timestamp field 436, a stream type field 438, an autoplay field 440, a pause field 442, and a performance metrics field 444. FIG. 4 illustrates exemplary data fields that may be included in block record 400 for a video digital content item. Other types of digital content items may include fewer, additional, or different data fields.

Block ID field 410 may store an ID associated with the particular data block. Hash of previous block field 420 may store a hash of the data stored in the previous data block. The hash may be used to check the integrity of the blockchain. For example, if the data stored in any of the previous blocks is changed, the hashes of all subsequent blocks will change and will not match the stored hashes, indicating that the data in the blockchain has changed.

Data type field 430 may store information identifying the type of data stored in the particular data block. As an example, data type field 430 may identify whether the data stored in the particular data block corresponds to content consumption data received from user device 140, a content streaming report received from content provider system 130, data aggregation data generated by aggregation module 350, and/or another type of data. Additionally, or alternatively, data type field 430 may include information identifying the type of digital content item associated with the data block, such as a live streaming video, non-live streaming video, real-time streaming audio, non-real-time streaming audio, a game, an advertisement, a particular type of interactive content such as a survey, and/or another type of digital content. In some implementations, blockchain ledger 330 may include multiple blockchains for different types of data and/or different types of digital content items.

Digital content ID field 432 may store an ID that uniquely identifies a particular digital content item. User ID field 434 may store a pseudonymous ID associated with a particular user device 140. The pseudonymous ID may be selected so that a real identity of a user of user device 140 cannot be determined from the pseudonymous ID.

Timestamp field 436 may indicate a start time and/or an end time for the consumption of the particular digital content item by the user of the particular user device 140. For example, timestamp field 436 may indicate a start time at which the user started watching a stream of a live performance and an end time at which the user stopped watching the stream.

Stream type field 438 may store information identifying a type of stream associated with the particular digital content item. For example, the information may identify the type of stream is a live video stream, a previously recorded video stream, and/or another type of stream. Autoplay field 440 may store information identifying whether the video player on user device 140 started to play the video stream automatically or whether the video stream started to play after a manual activation by the user. Pause field 442 may store information indicating how many times, and at what times, the user paused the video stream. Performance metrics field 444 may store information that may be used to determine one or more performance metric values for the particular digital content item, such a latency value, a packet delivery rate value, a throughput value, and/or another type of performance metric.

Although FIG. 4 shows exemplary components of blockchain ledger 330, in other implementations, blockchain ledger 330 may include fewer components, different components, additional components, or differently arranged components than depicted in FIG. 4.

Figure 5:
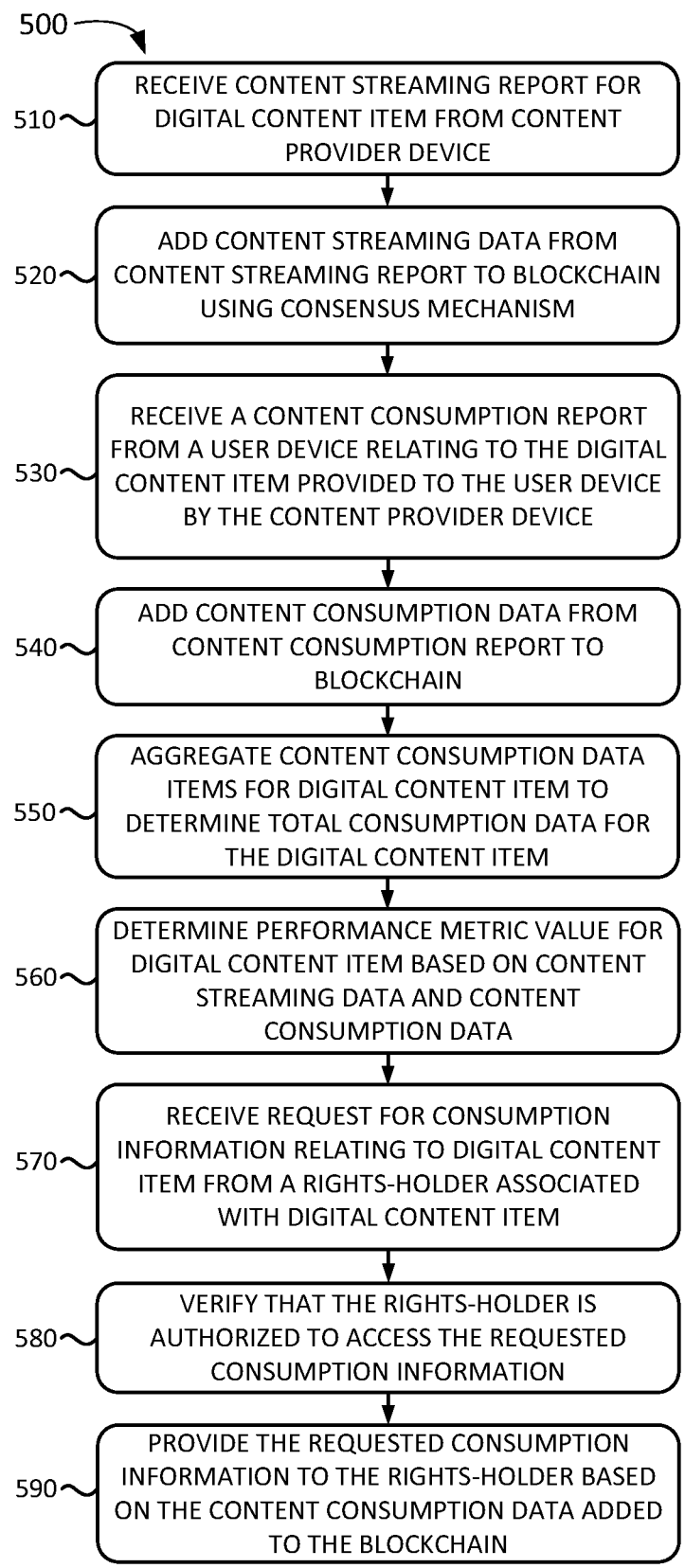
FIG. 5 illustrates a flowchart of reporting content consumption data using a blockchain according to an implementation described herein.

FIG. 5 illustrates a flowchart of reporting content consumption data using a blockchain according to an implementation described herein. In some implementations, process 500 of FIG. 5 may be performed by blockchain node device 150. In other implementations, some or all of process 500 may be performed by another device or a group of devices separate from blockchain node device 150.

As shown in FIG. 5, process 500 may include receiving a content streaming report for a digital content item from a content provider device (block 510) and adding content streaming data from the content streaming report to a blockchain using a consensus mechanism (block 520). For example, blockchain node 300 may provide a REST API that content provider system 130 may use to send a content streaming report that includes information relating to a particular digital content item. The content streaming report may be used to determine one or more performance metrics for the digital content item, such as a latency value, a packet delivery rate value, a throughput value, and/or another type of performance metric value.

Process 500 may further include receiving, from a user device, a content consumption report relating to the digital content item provided to the user device by the content provider device (block 530) and adding content consumption data from the content consumption report to the blockchain (block 540). For example, blockchain node 300 may provide a REST API that user device 140 may use to send a content consumption report to blockchain node 300. The content consumption report may include a content identifier identifying a digital content item, a pseudonymous user identifier associated with a user of user device 140, and timestamps indicating a start time and an end time of consumption for the digital content item by the user. If the digital content item corresponds to streaming video, the content consumption report may further include information identifying a stream type associated with the consumption of the digital content item, an indication whether the digital content item was started automatically, information indicating how many times the digital content item was paused, and/or other types of information that may be associated with measuring consumption of streaming video.

Content consumption data items for the digital content item may be aggregated to determine total consumption data for the digital content item (block 550), and a performance metric value for the digital content item may be determined based on the content streaming data and the content consumption data (block 560). For example, blockchain node 300 may determine a total number of users that consumed a particular digital content item and/or a total consumption time for the particular digital content item; consumption information for a user, such as a total consumption time for the user, types of content consumed by the particular user, times of day or days of week during which the user consumed content, etc.; one or more performance metrics for a digital content item, such as latency, packet delivery rate, throughput, etc.; and/or other types of data aggregation.

A request for consumption information relating a digital content item may be received from a rights-holder (block 570) and a verification may be made that the rights-holder is authorized to access the requested consumption information (block 580). For example, blockchain node 300 may provide a REST API that rights-holder device 160 may use to register with blockchain node 300 and to request consumption information associated with digital content items for which the user of rights-holder device 160 as access rights. Blockchain node 300 may receive a request for consumption data relating to the digital content item from rights-holder device 160 and may authenticate rights-holder device 160 based on information stored in access rights DB 380. If right-holder device 160 is not authenticated, the request for the consumption data may be denied.

The requested consumption information may be provided to the rights-holder based on the content consumption data added to the blockchain (block 590). For example, blockchain node 300 may provide the requested consumption data for the digital content item to rights-holder device 160.

Figure 6:
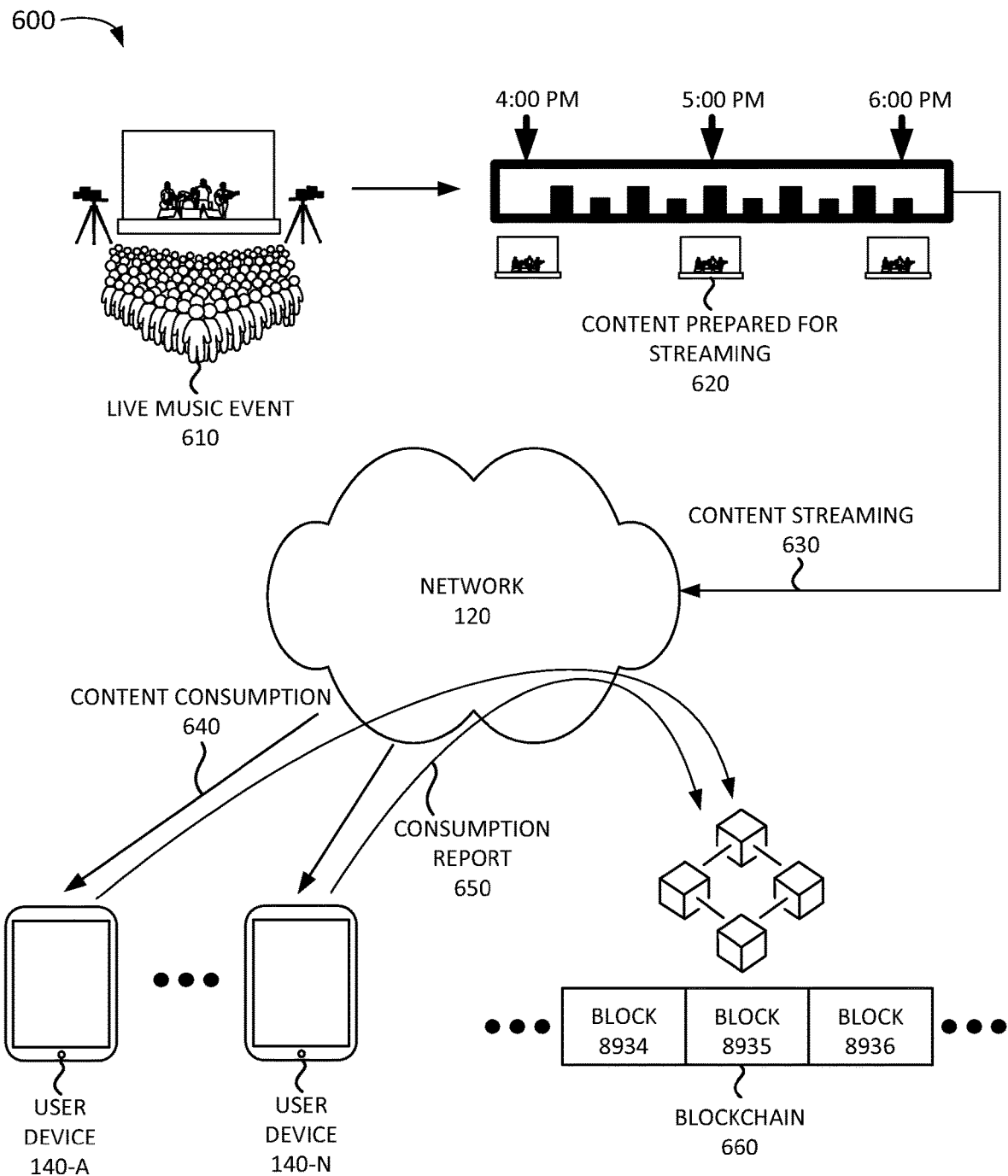
FIG. 6 illustrates an exemplary content consumption reporting environment according to an implementation described herein.

FIG. 6 illustrates an exemplary content consumption reporting environment 600 according to an implementation described herein. As shown in FIG. 6, a live music event 610 may be captured by camera and microphone devices (e.g., associated with content generation system 110) and the captured content may be prepared for streaming 620 (e.g., by content provider system 130). For example, the content may be time-shifted so that different performances are streamed at specific times (e.g., when there are multiple performance stages) and the time-shifted content may be streamed 630 via network 120 to user devices 140-A to 140-N. Thus, users of user devices 140-A to 140-N may view the streamed content and the viewing may be recorded as content consumption 640. Video player applications on user devices 140-A to 140-N may each send a content consumption report 650 to blockchain 660 (e.g., to blockchain node 150) using an API provided to the video player applications by blockchain node 150. Content consumption data from the content consumption reports 650 may be stored in blockchain 660.

Figure 7:
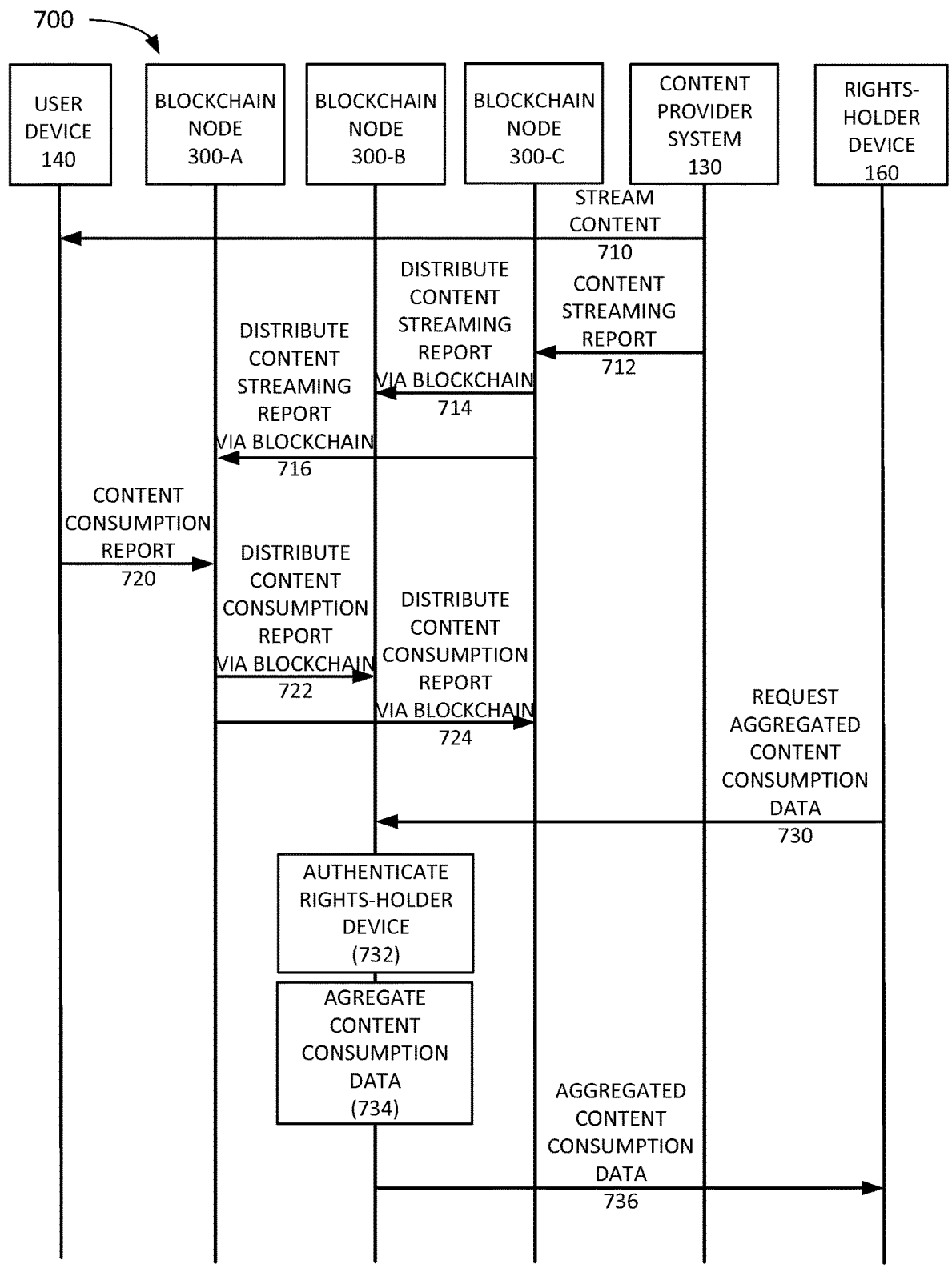
FIG. 7 illustrates an exemplary signal flow according to an implementation described herein.

FIG. 7 illustrates an exemplary signal flow 700 associated with environment 600 according to an implementation described herein. As shown in FIG. 7, signal flow 700 may include content provider system 130 streaming content (e.g., video of live music event 610) to user device 140 (signal 710). Furthermore, content provider system 130 may send a content streaming report to blockchain node 300-C, which may be the closest blockchain node to content provider system 130 (signal 712). Blockchain node 300-C may distribute the content streaming report via the blockchain to blockchain nodes 300-B and 300-A (signals 714 and 716). Blockchain nodes 300-A, 300-B, and 300-C may reach a consensus and add content streaming data from the content streaming report to the blockchain. The content streaming data may be used to determine one or more performance metric values when content consumption data from user device 140 is received.

User device 140 may send a content consumption report during, or after, viewing the streamed content to blockchain node 300-A, which may be the closest blockchain node to user device 140 (signal 720). Blockchain node 300-A may distribute the content consumption report via the blockchain to blockchain nodes 300-B and 300-C (signals 722 and 724). Blockchain nodes 300-A, 300-B, and 300-C may reach consensus and add content streaming data from the content streaming report to the blockchain.

At a later time, rights-holder device 160 may send a request for aggregation data to blockchain 300-B, which may be the closest blockchain node to rights-holder device 160 (signal 730). For example, the user of rights-holder device 160 may request blockchain 300-B for the number of users which watched a particular performance artist in the streamed content and/or the total consumption time for the streamed content. In response, blockchain node 300-B may authenticate right-holder device 160 by checking access rights DB 380 (block 732). After rights-holder device is authenticated as being authorized to access information associated with the requested content consumption information, blockchain node 300-B may generate aggregation data for the particular performance artist by, for example, determining the total number of users that watched the performance artist (block 734). Blockchain node 300-B may then provide the aggregation data to rights-holder device 160 (signal 736).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of signals with respect to FIG. 7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
providing, by a blockchain node in a computer device, a first Application Programming Interface (API) to a user device, wherein the first API is configured to enable the user device to send, to the blockchain node, content consumption reports relating to consumption of digital content items provided to the user device by content provider devices;
receiving, by the blockchain node and from a user device via the first API, a content consumption report relating to a digital content item provided by a content provider device to the user device;
adding, by the blockchain node, content consumption data from the content consumption report to a consumption data blockchain associated with the blockchain node, wherein the added content consumption data includes a content identifier for the digital content item, timestamps indicating a start time and an end time of consumption of the digital content item by the user device, and a pseudonymous user identifier associated with the user device;
providing, by the blockchain node, a second API to rights-holders, wherein the second API is configured to enable rights-holders to register with the blockchain node in an access rights blockchain managed by the blockchain node and to access consumption information stored in the consumption data blockchain for digital content items to which rights-holders have access rights;
receiving, by the blockchain node via the second API, a request for consumption information relating to the digital content item from a rights-holder associated with the digital content item, wherein the consumption information is stored in the consumption data blockchain;
verifying, by the blockchain node, that the rights-holder is authorized to access the requested consumption information, wherein verifying that the rights-holder is authorized to access the requested consumption information includes:
determining that the rights-holder is registered in the access rights blockchain as having access rights for information relating to the digital content item, wherein the access rights blockchain is different from the consumption data blockchain, and wherein the blockchain node participates in managing the consumption data blockchain and the access rights blockchain;
aggregating, by the blockchain node, a plurality of content consumption data items for the digital content item from the consumption data blockchain to determine a total number of users that consumed the digital content item or a total consumption time for the digital content item by all users that have consumed the digital content item; and
providing, by the blockchain node, the requested consumption information from the consumption data blockchain to the rights-holder, wherein the requested consumption information includes the determined total number of users that consumed the digital content item or total consumption time for the digital content item by all users that have consumed the digital content item.

2. The method of claim 1, wherein the digital content item includes at least one of:
   a video stream of a live event;
   a video stream of a stored digital media item;
   an advertisement; or
   a game.

3. The method of claim 1, further comprising:
   distributing the content consumption data to a plurality of blockchain nodes associated with the consumption data blockchain;
   determining that a consensus has been reached by the blockchain nodes to add the content consumption data to the consumption data blockchain; and
   adding the content consumption data to the consumption data blockchain, in response to determining that the consensus has been reached.

4. The method of claim 1, wherein the added content consumption data further includes one or more of:
   a stream type associated with consumption of the digital content item;
   an indication whether the digital content item was started automatically; or
   information indicating how many times the digital content item was paused.

5. The method of claim 1, wherein receiving the request for consumption information relating to the digital content item stored in the consumption data blockchain includes receiving a request for aggregation data associated with the digital content item, and wherein aggregating the plurality of content consumption data items for the digital content item from the consumption data blockchain to determine the total number of users that consumed the digital content item or the total consumption time for the digital content item is performed in response to receiving the request for the aggregation data associated with the digital content item.

6. The method of claim 1, further comprising:
   receiving, by the blockchain node and from a content provider, a content streaming report relating to the digital content item; and
   adding content streaming data from the content streaming report to the consumption data blockchain.

7. The method of claim 6, further comprising:
   determining a performance metric value for the digital content item based on the content streaming data and the content consumption data; and
   adding the performance metric value for the digital content item to the consumption data blockchain.

8. The method of claim 7, wherein the performance metric value includes:
   a latency value,
   a packet delivery rate value, or
   a throughput value.

9. The method of claim 1, wherein the consumption data blockchain stores different content consumption data for different types of digital content items.

10. A device comprising:
    a memory storing instructions; and
    a processor configured to execute the instructions to:
       provide, by a blockchain node, a first Application Programming Interface (API) to a user device, wherein the first API is configured to enable the user device to send, to the blockchain node, content consumption reports relating to consumption of digital content items provided to the user device by content provider devices;
       receive, by the blockchain node via the first API, a content consumption report relating to a digital content item provided by a content provider device to the user device;
       add, by the blockchain node, content consumption data from the content consumption report to a consumption data blockchain associated with the blockchain node, wherein the added content consumption data includes a content identifier for the digital content item, timestamps indicating a start time and an end time of consumption of the digital content item by the user device, and a pseudonymous user identifier associated with the user device;
       provide, by the blockchain node, a second API to rights-holders, wherein the second API is configured to enable rights-holders to register with the blockchain node in an access rights blockchain managed by the blockchain node and to access consumption information stored in the consumption data blockchain for digital content items to which rights-holders have access rights;
       receive, by the blockchain node via the second API, a request for consumption information relating to the digital content item stored in the consumption data blockchain from a rights-holder associated with the digital content item;
       verify, by the blockchain node, that the rights-holder is authorized to access the requested consumption information, wherein, when verifying that the rights-holder is authorized to access the requested consumption information, the processor is further configured to:
          determine that the rights-holder is registered in the access rights blockchain as having access rights for information relating to the digital content item, wherein the access rights blockchain is different from the consumption data blockchain, and wherein the blockchain node participates in managing the consumption data blockchain and the access rights blockchain;
       aggregate, by the blockchain node, a plurality of content consumption data items for the digital content item from the consumption data blockchain to determine a total number of users that consumed the digital content item or a total consumption time for the digital content item by all users that have consumed the digital content item; and
       provide, by the blockchain node, the requested consumption information from the blockchain to the rights-holder, wherein the requested consumption information includes the determined total number of users that consumed the digital content item or total consumption time for the digital content item by all users that have consumed the digital content item.

11. The device of claim 10, wherein the digital content item includes at least one of:
    a video stream of a live event;
    a video stream of a stored digital media item;
    an advertisement; or
    a game.

12. The device of claim 10, wherein the processor is further configured to:
    distribute the content consumption data to a plurality of blockchain nodes associated with the consumption data blockchain;

determine that consensus has been reached by the consumption data blockchain to add the content consumption data to the consumption data blockchain; and add the content consumption data to the consumption data blockchain, in response to determining that consensus has been reached.

13. The device of claim 10, wherein the added content consumption data further includes one or more of:

a stream type associated with consumption of the digital content item;

an indication whether the digital content item was started automatically; or information indicating how many times the digital content item was paused.

14. The device of claim 10, wherein, when receiving the request for consumption information relating to the digital content item stored in the consumption data blockchain from the rights-holder associated with the digital content item, the processor is further configured to receive a request for aggregate content associated with the digital content item, and wherein the processor is further configured to:

aggregate the plurality of content consumption data items for the digital content item from the consumption data blockchain to determine the total number of users that consumed the digital content item or the total consumption time for the digital content item in response to receiving the request for the aggregate content associated with the digital content item.

15. The device of claim 10, wherein the processor is further configured to:

receive a content streaming report from the content provider device relating to the digital content item; and add content streaming data from the content streaming report to the consumption data blockchain.

16. The device of claim 15, wherein the processor is further configured to:

determine a performance metric value for the digital content item based on the content streaming data and the content consumption data; and add the performance metric value for the digital content item to the consumption data blockchain.

17. The device of claim 10, wherein the consumption data blockchain stores different content consumption data for different types of digital content items.

18. A non-transitory computer-readable memory device storing instructions executable by a processor, the non-transitory computer-readable memory device comprising:

one or more instructions to provide, by a blockchain node, a first Application Programming Interface (API) to a user device, wherein the first API is configured to enable the user device to send, to the blockchain node, content consumption reports relating to consumption of digital content items provided to the user device by content provider devices;

one or more instructions to receive, by the blockchain node via the first API, a content consumption report from a user device relating to a digital content item provided by a content provider device to the user device;

one or more instructions to add, by the blockchain node, content consumption data from the content consumption report to a consumption data blockchain associated with the blockchain node, wherein the added content consumption data includes a content identifier for the digital content item, timestamps indicating a start time and an end time of consumption of the digital content item by the user device, and a pseudonymous user identifier associated with the user device;

one or more instructions to provide, by the blockchain node, a second API to rights-holders, wherein the second API is configured to enable rights-holders to register with the blockchain node in an access rights blockchain managed by the blockchain node and to access consumption information stored in the consumption data blockchain for digital content items to which rights-holders have access rights;

one or more instructions to receive, by the blockchain node via the second API, a request for consumption information relating to the digital content item stored in the consumption data blockchain from a rights-holder associated with the digital content item;

one or more instructions to verify, by the blockchain node, that the rights-holder is authorized to access the requested consumption information, wherein the one or more instructions verify that the rights-holder is authorized to access the requested consumption information further include:

one or more instructions to determine that the rights-holder is registered in the access rights blockchain as having access rights for information relating to the digital content item, wherein the access rights blockchain is different from the consumption data blockchain, and wherein the blockchain node participates in managing the consumption data blockchain and the access rights blockchain;

one or more instructions to aggregate, by the blockchain node, a plurality of content consumption data items for the digital content item from the consumption data blockchain to determine a total number of users that consumed the digital content item or a total consumption time for the digital content item by all users that have consumed the digital content item; and one or more instructions to provide, by the blockchain node, the requested consumption information from the blockchain to the rights-holder, wherein the requested consumption information includes the determined total number of users that consumed the digital content item or total consumption time for the digital content item by all users that have consumed the digital content item.

19. The non-transitory computer-readable memory device of claim 18, wherein the added content consumption data further includes one or more of:

a stream type associated with consumption of the digital content item;

an indication whether the digital content item was started automatically; or information indicating how many times the digital content item was paused.

20. The non-transitory computer-readable memory device of claim 18, wherein the one or more instructions to receive the request for consumption information relating to the digital content item stored in the consumption data blockchain from the rights-holder associated with the digital content item, further include one or more instructions to receive a request for aggregate content associated with the digital content item, and wherein the one or more instructions to aggregate the plurality of content consumption data items for the digital content item from the consumption data blockchain to determine the total number of users that consumed the digital content item or the total consumption time for the digital content item are executed in response to receiving the request for the aggregation data associated with the digital content item.

\* \* \* \* \*